United States Patent
Lin

(10) Patent No.: US 11,783,471 B2
(45) Date of Patent: Oct. 10, 2023

(54) METHOD AND DEVICE FOR DETERMINING WHETHER OBJECT INCLUDES DEFECT

(71) Applicant: Wistron Corporation, New Taipei (TW)

(72) Inventor: Cheng-Wei Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 315 days.

(21) Appl. No.: 16/820,635

(22) Filed: Mar. 16, 2020

(65) Prior Publication Data

US 2021/0201089 A1 Jul. 1, 2021

(30) Foreign Application Priority Data

Dec. 30, 2019 (TW) ................ 108148418

(51) Int. Cl.
| | | |
|---|---|---|
| *G06T 7/00* | (2017.01) | |
| *G06N 3/08* | (2023.01) | |
| *G06F 17/16* | (2006.01) | |
| *G06N 3/04* | (2023.01) | |
| *G06F 18/2413* | (2023.01) | |
| *G06F 18/21* | (2023.01) | |
| *G06V 10/762* | (2022.01) | |

(Continued)

(52) U.S. Cl.
CPC .............. *G06T 7/001* (2013.01); *G06F 17/16* (2013.01); *G06F 18/2178* (2023.01); *G06F 18/24137* (2023.01); *G06N 3/04* (2013.01); *G06N 3/08* (2013.01); *G06V 10/762* (2022.01); *G06V 10/764* (2022.01); *G06V 10/774* (2022.01); *G06V 10/82* (2022.01)

(58) Field of Classification Search
CPC .... G06K 9/6272; G06K 9/6263; G06F 17/16; G06N 3/04; G06N 3/08
See application file for complete search history.

(56) References Cited

U.S. PATENT DOCUMENTS 10,127,652 B2 11/2018 Gao et al.
10,637,544 B1 * 4/2020 Shattil ................. H04B 7/0473
(Continued)

FOREIGN PATENT DOCUMENTS

| CN | 105960702 | 9/2016 |
|---|---|---|
| CN | 107240086 | 10/2017 |

(Continued)

OTHER PUBLICATIONS

"Office Action of Taiwan Counterpart Application", dated Aug. 25, 2020, p. 1-p. 7.

(Continued)

*Primary Examiner* — Qun Shen
(74) *Attorney, Agent, or Firm* — JCIPRNET

(57) ABSTRACT

A method and device for determining whether an object includes a defect are provided. The method includes the following steps. A tested image of a tested object is obtained. Selected good product sample data corresponding to the tested object is obtained. A dissimilarity value between the tested image and the selected good product sample data is calculated by using a dissimilarity model, and whether the tested object is a good product or a defective product is determined according to the dissimilarity value.

17 Claims, 7 Drawing Sheets

(51) Int. Cl.
   *G06V 10/764*   (2022.01)
   *G06V 10/774*   (2022.01)
   *G06V 10/82*    (2022.01)

(56)             References Cited

U.S. PATENT DOCUMENTS

| | | | | |
|---|---|---|---|---|
| 2011/0170781 | A1* | 7/2011 | Bronstein | G06K 1/00 |
| | | | | 382/190 |
| 2015/0221076 | A1* | 8/2015 | Gao | G06T 7/001 |
| | | | | 382/149 |
| 2017/0140248 | A1* | 5/2017 | Wang | G06V 10/806 |
| 2018/0176243 | A1* | 6/2018 | Arnaldo | H04L 63/1425 |
| 2018/0260997 | A1* | 9/2018 | Petkov | G06F 18/214 |
| 2020/0380298 | A1* | 12/2020 | Aggarwal | G06V 30/1916 |
| 2020/0380403 | A1* | 12/2020 | Aggarwal | G06F 18/21 |
| 2021/0142210 | A1* | 5/2021 | Cheng | G06N 3/045 |

FOREIGN PATENT DOCUMENTS

| | | |
|---|---|---|
| CN | 105069807 | 3/2018 |
| CN | 108647706 | 10/2018 |
| TW | 201531963 | 8/2015 |

OTHER PUBLICATIONS

"Office Action of Taiwan Counterpart Application", dated Apr. 13, 2022, p. 1-p. 10.
"Office Action of China Counterpart Application", dated Jul. 6, 2023, p. 1-p. 9.

\* cited by examiner

METHOD AND DEVICE FOR DETERMINING WHETHER OBJECT INCLUDES DEFECT

CROSS-REFERENCE TO RELATED APPLICATION

This application claims the priority benefit of Taiwan application serial no. 108148418, filed on Dec. 30, 2019. The entirety of the above-mentioned patent application is hereby incorporated by reference herein and made a part of this specification.

BACKGROUND OF THE INVENTION

1. Field of the Invention

The invention relates to a technology of automatically determining whether an object includes a defect, and more particularly, to a method for automatically determining whether an object includes a defect by using an artificial intelligence algorithm and a device for implementing the method.

2. Description of Related Art

In the industrial automation field, due to the prosperous development of industrial Internet of Things, collaborative robots and artificial intelligence technology, manufacturers hope to replace manual operations with image identification technology such as automatic robots and automated optical inspection (AOI) to save manufacturing costs and to improve the defect identification rate.

However, in the industrial automation technology, the defect determining is performed strictly according to a predetermined test standard. When an "overkill (many tested objects are regarded as defective objects due to an excessively high test standard)" caused by an excessively high test standard arises, extra manpower is needed to perform a second test on the defective objects, so as to redefine the products overkilled by an instrument of the industrial automation technology as good objects. Therefore, many companies are trying to introduce the artificial intelligence to the industrial automation technology, and expect determining results of tested objects to be accurate, quickly obtainable, and consistent.

However, the artificial intelligence technology currently used usually includes classifying different types of objects and parts on a circuit board in a manual way, and then building a supervised binary classification model capable of distinguishing whether each object or part is normal or defective based on a large amount of information after classification by using a machine learning algorithm. If the amount of data of a type of objects or parts is inadequate, it is difficult for the artificial intelligence technology to train a model capable of well classifying defects of the type of objects/parts, causing an error rate of defect determining to be at a high level.

SUMMARY OF THE INVENTION

The embodiment of the invention provides a method and device for determining whether an object includes a defect which may be applied to multiple objects, circuit components, or parts, and defect determining of the object is performed automatically by using a ternary artificial intelligence algorithm, so that embodiments of the invention may be applied more broadly, and an error rate of defect determining is further reduced on the basis of the original automated optical inspection technology.

The method for determining whether the object includes a defect in an embodiment of the invention includes the following: obtaining a tested image of a tested object; obtaining selected good product sample data corresponding to the tested object; and calculating a dissimilarity value between the tested image and the selected good product sample data by using a dissimilarity model, and determining whether the tested object is a good product or a defective product according to the dissimilarity value.

The device for determining whether the object includes a defect in an embodiment of the invention includes an object database, an image source device, and a processor. The object database possesses at least one piece of good product sample data corresponding to multiple objects. The image source device obtains a tested image of a tested object. The processor is coupled to the object database and the image source device. The processor obtains the tested image of the tested object by using the image source device, and obtains selected good product sample data in a training dataset corresponding to the tested object. In addition, the processor calculates a dissimilarity value between the tested image and the selected good product sample data by using a dissimilarity model, and determines whether the tested object is a good product or a defective product according to the dissimilarity value.

Based on the foregoing, in embodiments of the invention, a sharable machine learning algorithm model is built by using different types of objects/parts to automatically determine whether the object includes a defect and meanwhile is able to be applied to multiple objects, circuit components or parts, and an error rate of defect determining is further reduced based on the original automated optical inspection technology. Therefore, in embodiments of the invention, different machine learning algorithm models for different objects/parts do not need to be built, so that a research and development time of a defect classification model for new objects/parts is reduced when a new production line is built, and a relatively effective machine learning algorithm model can still be built even in lack of adequate amount of good product data and defective product data of the new objects/parts. Moreover, by performing a second test when automated optical inspection identification technology has been performed, "overkill" events can be reduced.

DESCRIPTION OF THE EMBODIMENTS

Figure 1:
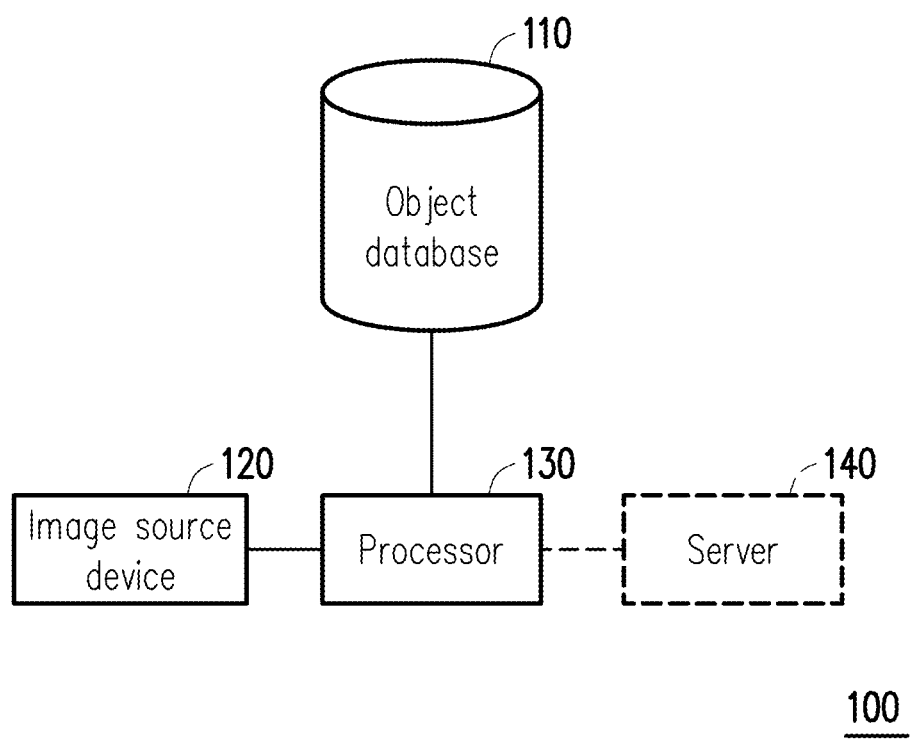
FIG. 1 is a hardware block diagram of a device for determining whether an object includes a defect according to an embodiment of the invention.

For technologies related to defect determining applied in modern industry, different machine learning algorithm models configured to classify defects are trained respectively according to different types of objects or parts (for example, circuit components, capacitive components, inductive components, and the like regularly used on a circuit board). Therefore, a specific number of defective product data samples are needed to train the foregoing machine learning algorithm model relatively completely for each type of objects, and a dependence on the amount of data of each type of objects is developed. The second testing technology regularly used currently is a technology that classifies defects "for each type of objects or parts". However, when the amount of defect information (or referred to as defect training data) of some objects or parts is inadequate, it is difficult to obtain a relatively good determining result in a scenario of defect determining.

Therefore, in an embodiment of the invention, a sharable machine learning algorithm model is built by using different types of objects/parts to automatically determine whether the object includes a defect, that is, building a model by using a triplet loss supervised learning algorithm, and meanwhile is able to be applied to multiple objects, circuit components or parts and an error rate of defect determining is further reduced based on the original automated optical inspection technology. Therefore, in an embodiment of the invention, different machine learning algorithm models for different objects do not need to be built, so that a research and development time of a defect classification model for new objects is saved when a new production line is built, and a relatively effective machine learning algorithm model can still be built in lack of adequate amount of good product data and defective product data of the new objects.

That is, in an embodiment of the invention, three types of data (that is, good product data, defective product data of different types of objects—which may be referred to as parts—and good product sample data of objects) are used as a training dataset, which is also referred to as a ternary training dataset, to build a dissimilarity model sharable for multiple objects/parts by using a triplet loss supervised learning algorithm. The dissimilarity model therefore possesses a capability to measure "a dissimilarity between a good product sample and a tested object", so that an embodiment of the invention may perform a second test on objects regarded as defective by using the artificial intelligence technology, to reduce the "overkill" events. The "sharable machine learning algorithm model" and related technologies of an embodiment may be applied to multiple fields. Especially after performing an automated optical inspection identification technology, a second test is performed on the objects regarded as defective by using the technologies described in an embodiment of the invention instead of manpower, so as to reduce the "overkill" events.

The "objects" in an embodiment are circuit components used on a printed circuit board, for example, circuit components such as a capacitor, a resistor, an inductor, or a packaged chip. Most defective circuit components can be observed from the appearance. For example, a pin of the circuit component is broken, a crack appears on the surface, a welding spot of the circuit component has fallen off, an edge of the component housing is shattered, and the like. Those who apply this embodiment may determine whether the objects are good products or defective products from the appearance by using an embodiment of the invention.

Figure 2:
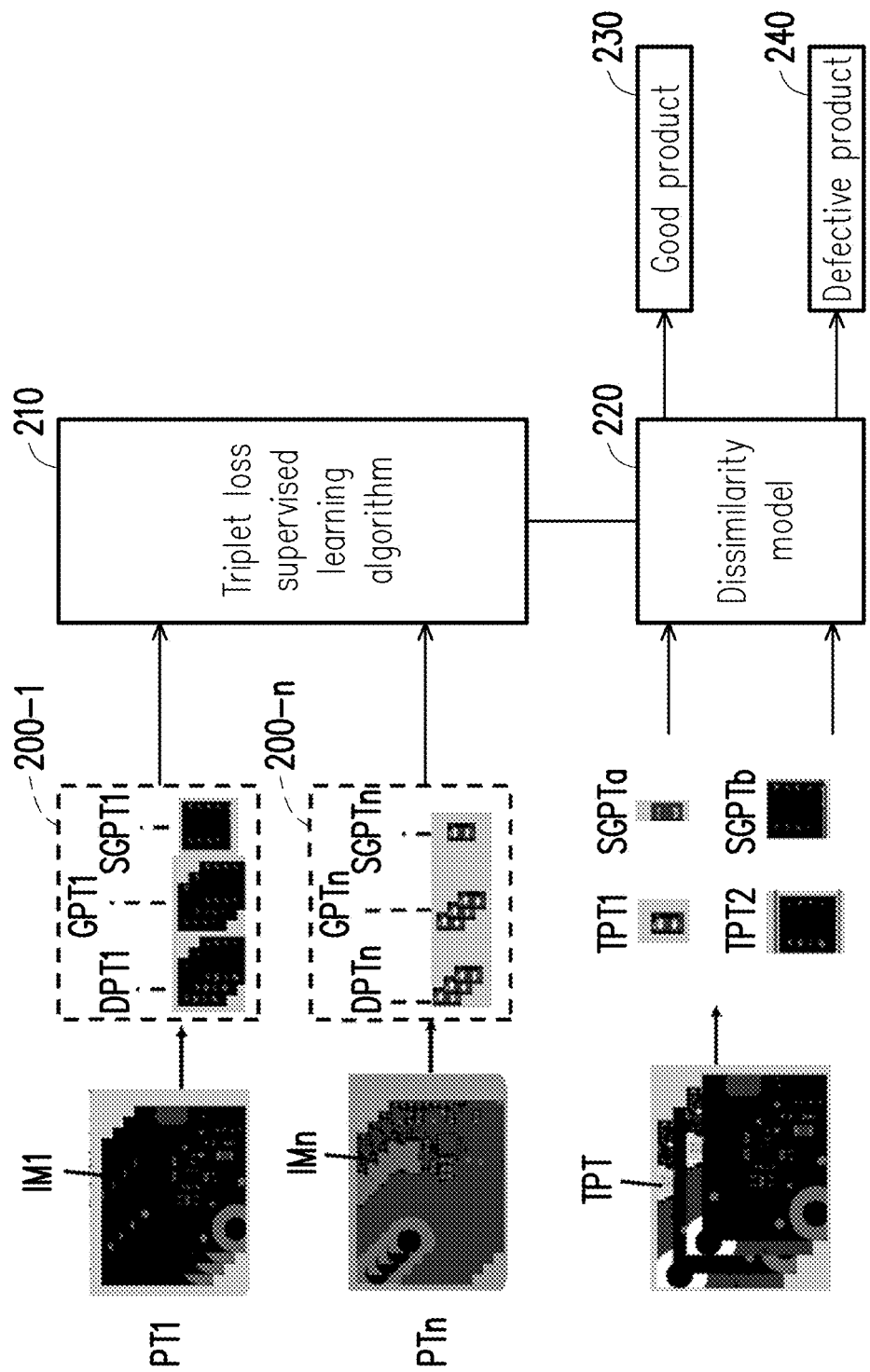
FIG. 2 is a schematic operation diagram of a method for determining whether an object includes a defect and a corresponding device according to an embodiment of the invention.

FIG. 1 is a hardware block diagram of a device for determining whether an object includes a defect according to an embodiment of the invention. FIG. 2 is a schematic operation diagram of a method for determining whether an object includes a defect and a corresponding device according to an embodiment of the invention. It is specially noted that, FIG. 2 is mainly used to illustrate image data of an object, an artificial intelligence algorithm, a trained model and a procedure of operations such as defect identification. The blocks in FIG. 2 are functional modules, instead of hardware modules, drawn for convenience of description. The blocks may be realized a processor in collaboration with software, firmware, algorithm, or database, and the like, and stored in a corresponding storage apparatus, for example, stored in an object database 110 or a server 140 in FIG. 1. Referring to FIG. 1 and FIG. 2, a defect determining device 100 mainly includes the object database 110, an image source device 120, and a processor 130. The object database 110 possesses at least multiple training datasets corresponding to multiple objects. Objects PT1 to PTn (n is a positive integer) shown in FIG. 2 each include multiple pieces of image data IM1 to IMn, and an image may be captured by presenting a location of each object with a bill of material (BOM) by using the automated optical inspection identification technology or artificial intelligence training, to capture circuit components in the image data IM1 to IMn respectively, and classify the same into various types of data in the training datasets 200-1 to 200-$n$. The training datasets 200-1 to 200-$n$ of this embodiment possess at least three data types in each object PT1 to PTn, respectively being defective product data DPT1 to DPTn, good product data GPT1 to GPTn, and good product sample data SGPT1 to SGPTn. That is, the training datasets 200-1 to 200-$n$ each include at least one piece of the defective product data DPT1 to DPTn, at least one piece of the good product data GPT1 to GPTn, and at least one piece of the good product sample data SGPT1 to SGPTn of the corresponding objects PT1 to PTn. The training datasets 200-1 to 200-$n$ are stored in the object database 110 in FIG. 1.

In this embodiment, the "defective product data", "good product data", and "good product sample data" of the corresponding objects herein are image data marked in advance. Those who apply this embodiment may also distinguish whether image data of a corresponding type of object indicates a good product or a defective product, so as to arrange the foregoing "defective product data", "good product data", and "good product sample data". A larger amount of pieces of the "defective product data" and the "good product data" indicates a more precise subsequent defect determining of the tested objects performed by using the machine learning algorithm model undergone training in this embodiment. Good product sample data SGPT1 to SGPTn is one or more pieces of most representative good product data selected from good product data GPT1 to GPTn by marking in advance. In this embodiment, the objects PT1 to PTn each possess at least one piece of the good product sample data SGPT1 to SGPTn.

The image source device 120 is configured to obtain tested images TPT, TPT1 and TPT2 of the tested object. The defect determining device 100 of this embodiment may communicate and transmit data with the automated optical inspection identification system. Those who apply this embodiment may perform a first defect test by using the automated optical inspection identification system, and then perform a second defect test on the objects determined to be defective by using the defect determining device 100 described in this embodiment of the invention, to avoid "overkill". Therefore, the defect determining device 100 may obtain image data of objects through the automated optical inspection identification system that performs the first test. That is, in this embodiment, the automated optical inspection identification system may be regarded as the image source device 120. Those who apply this embodiment may configure an extra image capturing device (for example, a photographic camera, or a video camera), and capture an image of an object to perform subsequent operations of this embodiment.

The processor 130 is configured to access the object database 110 and the image source device 120, calculate corresponding trained model by using an artificial intelligence algorithm, and implement relevant procedures described in this embodiment. The processor 130 of this embodiment may be a processor in a notebook computer, a personal computer, or a specific server. The processor 130 may also communicate and cooperate with other servers (such as the server 140 shown in FIG. 1) through network, to implement this embodiment by using hardware computing resources effectively.

Figure 3:
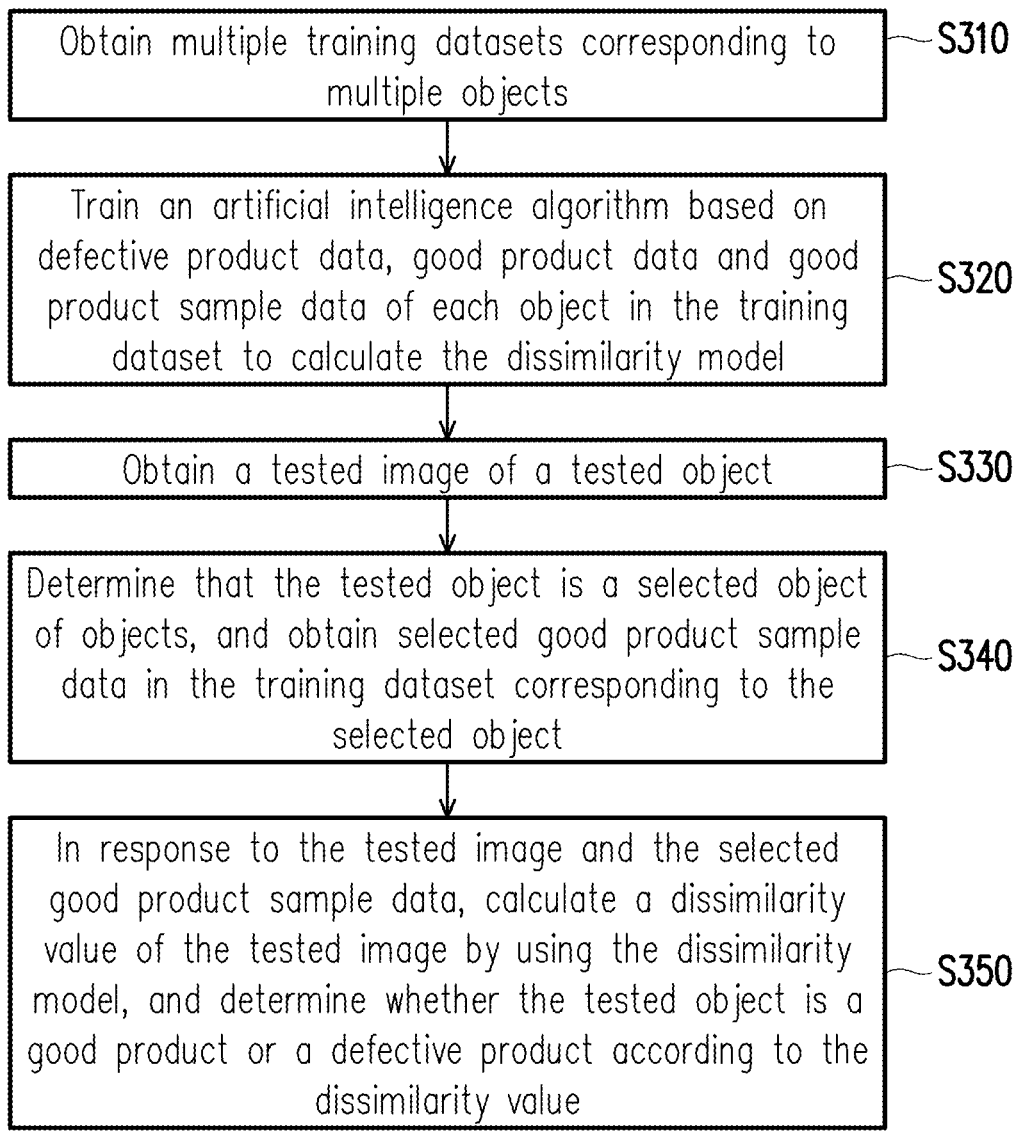
FIG. 3 is a flowchart of a method for determining whether an object includes a defect according to an embodiment of the invention.

FIG. 3 is a flowchart of a method for determining whether an object includes a defect according to an embodiment of the invention. Referring to FIG. 1 to FIG. 3, in step S310, the processor 130 obtains multiple training datasets 200-1 to 200-*n* corresponding to multiple objects PT1 to PTn from the object database 110. The training datasets 200-1 to 200-*n* each include at least one piece of the defective product data DPT1 to DPTn, at least one piece of the good product data GPT1 to GPTn, and at least one piece of the good product sample data SGPT1 to SGPTn of the corresponding objects PT1 to PTn.

In step S320, the processor 130 trains an artificial intelligence algorithm (which is the triplet loss supervised learning algorithm 210 in FIG. 2) based on the defective product data DPT1 to DPTn, the good product data GPT1 to GPTn, and the good product sample data SGPT1 to SGPTn of each object PT1 to PTn in the training datasets 200-1 to 200-*n* to calculate a corresponding trained model (which is the dissimilarity model 220 in FIG. 2).

Generally, the steps of performing artificial intelligence learning by the triplet loss supervised learning algorithm 210 are sequentially described as follows. Firstly, a trained model (for example, a dissimilarity model f) configured to calculate a dissimilarity value is constructed. In this embodiment, a dissimilarity model which is performing training is referred to as the dissimilarity model f, and a dissimilarity model which has undergone training is referred to as the dissimilarity model 220. Those who apply this embodiment should know that, the dissimilarity model 220 undergone training may also need to be trained again due to joining of a new training dataset. Therefore, in this embodiment, while being the same object, the dissimilarity model f is distinguished for being relatively easier to be illustrated in the following equations, and the dissimilarity model 220 is represented in a different way for being relatively easier to be drawn. Subsequently, during each training, the dissimilarity model f is made to learn a difference between the good product sample data and the defective product data and a difference between the good product sample data and the good product data of a same object (for example, an object PT1) by using the training datasets 200-1 to 200-*n* corresponding to the object PT1 and the triplet loss supervised learning algorithm 210. For example, a dissimilarity between good product sample data SGPT1 and multiple good product data GPT1 is made low (that is, the dissimilarity value calculated is low) by using the dissimilarity model f, and a dissimilarity between good product sample data SGPT1 and multiple defective products data DPT1 is made high (that is, the dissimilarity value calculated is high) by using the dissimilarity model f. In addition, the processor 130 of this embodiment trains the dissimilarity model f one by one by using the objects PT1 to PTn and the corresponding training datasets 200-1 to 200-*n*. In the training process, the dissimilarity model f requires a large number of iteration training, and the training may not be regarded as being finished until the triplet loss function converges. The number of times that the dissimilarity model undergoes training is associated with the number of types of the objects PT1 to PTn and relevant parameters. Therefore, after the foregoing large volume of training, when the calculation of different objects PT1 to PTn converges, the dissimilarity model 220 undergone training may be a model that may "compare similarities and differences between all the different objects and the corresponding good product sample data". The "converge" means that, after a neural network or an artificial intelligence algorithm undergoes training by using large amount of data, a parameter/weight on each neuron that forms the neural network or the artificial intelligence algorithm may approach a constant, and the phenomenon is called "convergence". That is, in this embodiment, a loss value is calculated by the triplet loss function during training, and after multiple times of training, if the loss value obtained in each training approaches a small and stable value, it means "convergent".

Figure 4A:
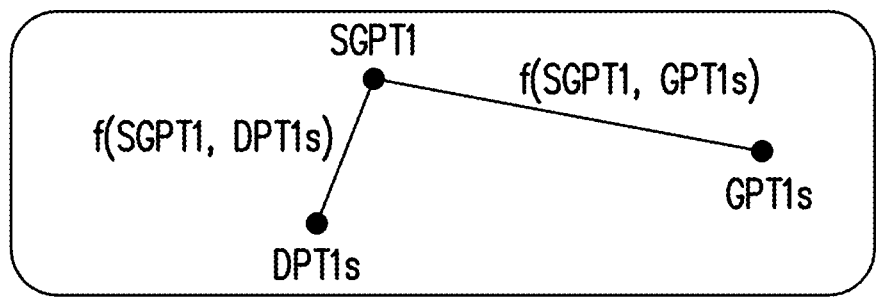
FIG. 4A and FIG. 4B are schematic diagrams of building and adjusting a dissimilarity model f by using a triplet loss supervised learning algorithm.
Figure 4B:
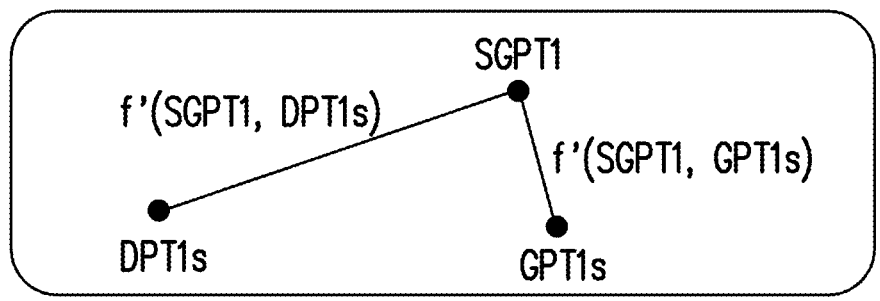

FIG. 4A and FIG. 4B are schematic diagrams of building and adjusting a dissimilarity model f by using a triplet loss supervised learning algorithm 210. FIG. 4A is a schematic diagram of a state in which the dissimilarity model f is trained by the training dataset 200-1 of the object PT1 but the training is not finished (or referred to as not convergent). FIG. 4B is a schematic diagram of a state in which the dissimilarity model f' is trained by the training dataset 200-1 of the object PT1 and the training is finished (or referred to as convergent). By an example of the result of mathematical operations of the dissimilarity model f in FIG. 4A, a distance between a cluster of the defective product data DPT1*s* and the good product sample data SGPT1 (a dissimilarity represented by f(SGPT1,DPT1*s*)) is shorter than a distance between a cluster of the good product data GPT1*s* and the good product sample data SGPT1 (a dissimilarity represented by f(SGPT1,GPT1*s*)). In this case, a result calculated by the dissimilarity model f is not a result predetermined by the triplet loss supervised learning algorithm 210 (that is, a dissimilarity between the cluster of defective product data DPT1*s* and the good product sample data SGPT1 is low, while a dissimilarity between the cluster of the good product data GPT1*s* and the good product sample data SGPT1 is high), and thus, causing that a result calculated by the dissimilarity model f by using the good product sample data SGPT1 and the tested object (that is, a dissimilarity value) does not satisfy the requirement of this embodiment. That is, when a dissimilarity value between the tested image and the good product sample data SGPT1 calculated by the dissimilarity model f is relatively high (for example, higher than a threshold), the tested image is relatively close to the cluster of the good product data GPT1s, so that the tested object is more likely to be a good product; and when the dissimilarity value calculated by the dissimilarity model f is relatively low (for example, lower than a threshold), the tested image is relatively distant from the cluster of the good product data GPT1s, so that the tested object is more likely to be a defective product.

On the contrast, by an example of the result of mathematical operations of dissimilarity model f' in FIG. 4B, a distance between a cluster of defective product data DPT1s and the good product sample data SGPT1 (a dissimilarity represented by f(SGPT1,DPT1s)) is longer than a distance between a cluster of the good product data GPT1s and the good product sample data SGPT1 (a dissimilarity represented by f(SGPT1,GPT1s)), and thus causing that a result calculated by the dissimilarity model f' by using the good product sample data SGPT1 and the tested object (that is, a dissimilarity value) satisfies the requirement of this embodiment. That is, when a dissimilarity value between the tested image and the good product sample data SGPT1 calculated by the dissimilarity model f' is relatively high (for example, higher than a threshold), the tested object is relatively distant from the cluster of the good product data GPT1s, so that the tested object is more likely to be a defective product; and when the dissimilarity value calculated by the dissimilarity model f' is relatively low (for example, lower than a threshold), the tested object is relatively close to the cluster of the good product data GPT1s, so that the tested object is more likely to be a good product.

Again referring to FIG. 2 and FIG. 3, after the dissimilarity model 220 has undergone training (that is, has converged) in step S320, the processor 130 obtains the tested images TPT1, TPT2 of the tested object from the image source device 120 in step S330. Specifically, after obtaining the tested image TPT, the processor 130 may obtain at least one tested object on the tested image TPT by using an automated optical inspection identification system or other ways of video processing, and the at least one tested object is marked as image data of the tested object TPT1 and TPT2 in FIG. 2.

In step S340, the processor 130 determines that the tested objects TPT1 and TPT2 are respectively one of the objects PT1 to PTn in the object database 110 (the object is referred to as a selected object) by respectively using the image data of the tested objects TPT1 and TPT2, and obtains selected good product sample data in the training dataset corresponding to the selected object from the object database 110. For example, in FIG. 2, the good product sample data corresponding to the tested object TPT1 is selected good product sample data SGPTa, and the good product sample data corresponding to the tested object TPT2 is selected good product sample data SGPTb, where a and b are positive integers equal to or less than n.

In step S350, in response to the tested image and the selected good product sample data (for example, the tested image TPT1 and the selected good product sample data SGPTa of the tested object; the tested image TPT2 and the selected good product sample data SGPTb of the tested object), the processor 130 respectively calculates dissimilarity values between the tested image TPT1, the tested image TPT2 and the selected good product sample data SGPTa, SGPTb of the tested objects by using the dissimilarity model 220, and determines whether the tested objects TPT1, TPT2 are good products or defective products according to the dissimilarity values. That is, according to the dissimilarity model 220 undergone training in the foregoing step S320, if the dissimilarity value calculated by the dissimilarity model 220 is higher than a threshold, the tested objects TPT1, TPT2 are determined to be defective products (as indicated by a block 240 in FIG. 2); and if the dissimilarity value calculated by the dissimilarity model 220 is lower than a threshold, the tested objects TPT1, TPT2 are determined to be good products (as indicated by a block 230 in FIG. 2).

Detailed procedures of the triplet loss supervised learning algorithm 210 in FIG. 2 are described herein. In the triplet loss supervised learning algorithm 210, characteristic capturing is performed by using a convolutional neural network (CNN), and subsequently eigenvalues of good product sample data and good product data or defective product data are compared to serve as dissimilarity values. The CNN is one of the regular deep learning technologies, and may obtain a good result in various types of image processing. The CNN performs comparison by using eigenvectors in the image data. The "eigenvector" refers to a 128-dimensional or 64-dimensional eigenvector (dimension is also a regulable parameter in the CNN) condensed after the image is repeatedly calculated by the CNN. This embodiment compares the tested object with the good product data, the defective product data, and the good product sample data by using the eigenvectors.

In this embodiment, "thresholds" related to the dissimilarity value are determined by experiment data, to be a standard low enough for dissimilarity values. The standard is usually regarded as a parameter of the deep learning algorithm, and exact values of the thresholds are usually determined according to an overall situation of cross-over experiment of the data after the dissimilarity model 220 undergoes training. In addition, this embodiment processes the good product data and the defective product data by using a same eigenvector obtaining method, and therefore, dissimilarity is calculated by using a same method.

In this embodiment, by an example of the triplet loss function in collaboration with the CNN, a training method of the dissimilarity model 220 is described as follows. Firstly, a pair of good product data and defective product data that belong to a same type of objects are selected from a training dataset. The two and predetermined good product sample data are put into a CNN model to calculate eigenvectors respectively corresponding to the three. The three eigenvectors of the three into a triplet loss function, and those who apply this embodiment may adjust weights of the three eigenvectors in the CNN model according to an actual condition. If the weights in the CNN model are not configured appropriately, a difference between the good product sample data and the good product data may increase, and a loss value may also increase. On the contrast, if the weights in the CNN model are configured appropriately, the difference between the good product sample data and the good product data may reduce, and the loss value may also reduce. An adjustment range of the weights in the training is determined by a value of the triplet loss function, to adjust the weights again. The foregoing weights are repeatedly trained and adjusted, until the loss value reaches a minimum and remains stable (or referred to as convergent). In this case, the training of the dissimilarity model and the weights corresponding to the dissimilarity model may be referred to as finished.

In this embodiment, the defective product data of the object may only possess one piece of image data. This embodiment may also infer that the type of objects may include a defect according to a state of the defective product data of another type of objects. For example, a sharable trained model (such as a dissimilarity model) is trained by using defective product data of multiple objects, so that the trained model is capable of simultaneously determining that a welding spot of an object TP1 has fallen off, and determining that an edge of the housing of an object TP2 is shattered. With the knowledge that the edge of the housing of the object TP2 is shattered in the trained model, when determining whether the object TP1 includes a defect by using the trained model, if an image with a shattered edge of the object TP1 appears for a first time (which means the image of the shattered edge of the object TP1 is not used to train the trained model before), the trained model may also determine that the object TP1 is a defective product. The trained model may recognize different types of defects according to a small amount of defective product data.

Therefore, in step S350 of FIG. 3, after training a convergent dissimilarity model 220, the processor may obtain good product sample data of a same type of the tested object, and calculate an eigenvector of the good product sample data (represented by f(good product sample data)) and an eigenvector of the image data of the tested object (represented by f(tested object)) by using the dissimilarity model 220. Subsequently, a dissimilarity value is calculated by using the foregoing two eigenvectors. For example, a value of a minimum sum of squares of the foregoing two eigenvectors is calculated as the dissimilarity value. Lastly, the foregoing dissimilarity value is compared with the threshold determined during the training of the dissimilarity model f, to determine whether the tested object is a good product or a defective product. For example, if the threshold is 0.6, the dissimilarity value of the first tested object calculated by this embodiment is 0.2, and the dissimilarity value of the second tested object calculated by this embodiment is 0.8, the first tested object is determined to be a good product (because 0.2<0.6), and the second tested object is determined to be a defective product (because 0.8>0.6).

This embodiment may be used in collaboration with an automated optical inspection system to obtain a better defect determining result. After the automated optical inspection system detects image data of an object with problem, the foregoing image data of the object with problem is provided to the processor 130. The processor 130 performs determining to acquire a name of the foregoing object with problem (for example, searches a bill of material (BOM) sharable with the automated optical inspection system, or performs determining by using a video identification technology), and then acquires the good product sample data corresponding to the object with problem from the object database. Subsequently, the defect determining may be performed according to corresponding steps shown in FIG. 3.

Figure 5:
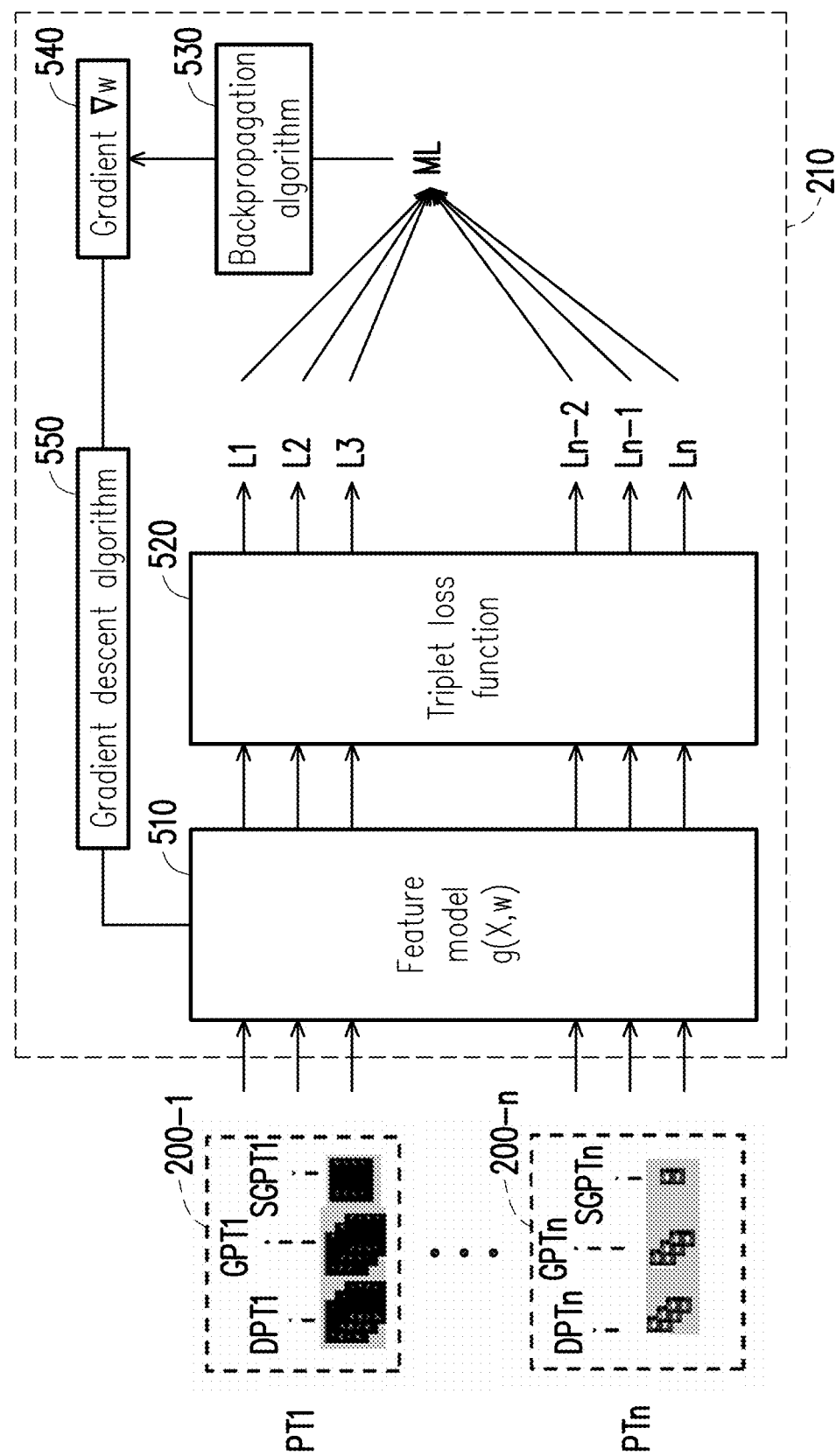
FIG. 5 is an internal schematic flowchart of the triplet loss supervised learning algorithm in FIG. 2 according to a first embodiment.

FIG. 5 is an internal schematic flowchart of the triplet loss supervised learning algorithm 210 in FIG. 2 according to a first embodiment. In FIG. 5, the triplet loss supervised learning algorithm 210 possesses a feature model 510 (represented as g(X,w)) and a triplet loss function 520. The feature model 510 and the triplet loss function 520 in this embodiment may be implemented by a processor in collaboration with software, firmware, algorithm, or database, and the like, and stored in a corresponding storage apparatus. Firstly, training datasets 200-1 to 200-n corresponding to multiple objects PT1 to PTn and a weight w are put into the feature model 510, to obtain multiple eigenvectors of each image data in the training datasets 200-1 to 200-n. In addition, a triplet loss value (represented by L1 to Ln) of each object PT1 to PTn is calculated by using the triplet loss function 520 and the foregoing eigenvectors. Subsequently, the triplet loss values L1 to Ln corresponding to each object are summed up, to obtain a total triplet loss value ML of all the training datasets. Subsequently, a gradient ∇w 540 of the weight w and the triplet loss value is calculated by using a backpropagation algorithm 530, and iteration is performed on the weight w with the gradient ∇w 540 by using a gradient descent algorithm 550, to further obtain a new iterated weight w. The iterated weight w is put into the feature model 510 for training, to train the dissimilarity model again. The iterated weight w possesses a less total triplet loss value ML compared with the total triplet loss value corresponding to the weight w before the iteration. In addition, when the total triplet loss value approaches a constant after multiple times of training, it indicates that the total triplet loss value ML is "convergent", and the dissimilarity model f has undergone training to become the dissimilarity model 220. In this case, the iterated weight w may be referred to as a trained weight. The dissimilarity model 220 calculates a dissimilarity value between the tested object and the selected good product sample data by using the trained weight. In this embodiment, the weight w during first training is usually generated randomly, or those who apply this embodiment may configure corresponding parameters according to experience. Because during each training, loss values of different objects (even different defects thereof) are all calculated, the weight w used in last convergence is a trained weight suitable for various types of cases.

The feature model 510 represented by g(X,w) is an example of building a feature model calculating structure by using the CNN, and may be implemented by a layer-3 CNN. In this embodiment, a 64-dimensional vector is calculated by a first layer CNN using eight different convolutional kernels, a second layer CNN using 16 different convolutional kernels, and a last layer CNN using a fully connected layer. The 64-dimensional vector is the eigenvector of the object data. The structure is referred to as a g function in this embodiment. The weight w in this embodiment may be combined by multiple weights of the convolutional kernels of the first layer CNN, the convolutional kernels of the second layer CNN, and the fully connected layer of the third layer CNN. The weight w may be a value or a set of multiple values. The foregoing layer-3 CNN may retain a relatively large amount of feature information and reduce an amount of feature information. Those who apply this embodiment may also operate feature model 510 by using other methods, which is not limited hereto.

The triplet loss function 520 may be represented by the following equation (1), and a 2-dimensional eigenvector is used as an example herein:

$$L(X_A, X_P, X_N, w) = \max(\|g(X_A,w) - g(X_P,w)\|^2 - \|g(X_A,w) - g(X_N,w)\|^2 + \alpha, 0) \quad (1)$$

In the equation (1), "w" is a weight, and "X" is image data of an object. "$X_A$, $X_P$, $X_N$" respectively represent the foregoing good product sample, good product, and defective product. "α" represents a neural network hyperparameter. Those who apply this embodiment may adjust the neural network hyperparameter α according to requirements. In this embodiment, the neural network hyperparameter α is usually configured to be 0.2 or a similar value. The reason for maximizing the values (that is, taking max) in the equation (1) is that, it is expected that relatively well mathematical properties may be used during training. When calculating a value of the triplet loss function 520, if a negative value and a positive value are added, a loss of a failed case is neutralized. For example, given two groups of ternary training datasets and two weights Wa and Wb, loss values of the two groups of ternary training datasets calculated by using the weight Wa are "−10" and "10", and a total loss calculated by using the weight Wa is "0" (that is, (−10)+10). On the other hand, loss values of the two groups of ternary training datasets calculated by using the weight Wb are "0" and "0", and a total loss of the ternary training datasets W2 is also "0". In this case, it may not be distinguished that the weight Wb is actually better than the weight Wa.

By using this embodiment as an example, the convolutional kernel in the first layer CNN has 80 weights in total, the convolutional kernel in the second layer CNN has 1,168 weights in total, and the fully connected layer in the third layer CNN has 262,208 weights in total. Therefore, w is a set of a total of 263,456 weights. For example, in this embodiment, the neural network hyperparameter $\alpha$ is set to be 0.2, and a two dimensional eigenvector is used as an example. An example of the weight $w_1$, the corresponding feature model 510 ($g(X,w_1)$), and the triplet loss function 520 (equation (1)) is illustrated by the following equation (2):

$$g(X_A,w_1)=(1,0),\ g(X_P,w_1)=(0.5,0.5),\ g(X_N,w_1)=(0.8,0),$$
$$L=\max((0.5,-0.5)^2-(0.2,0)^2,0)=\max(0.5071,0)= 0.5071 \quad (2)$$

$g(X_A,w_1)$ represents calculating the eigenvector by putting the weight $w_1$ and the good product sample data into the g function, to obtain the eigenvector (1,0); $g(X_P,w_1)$ represents calculating the eigenvector by putting the weight $w_1$ and the good product data into the g function, to obtain the eigenvector (0.5,0.5); and $g(X_N,w_1)$ represents calculating the eigenvector by putting the weight $w_1$ and the defective product data into the g function, to obtain the eigenvector (0.8,0). A loss value of 0.5071 is obtained by putting the three eigenvectors into the triplet loss function.

An example of the weight $w_2$, the corresponding feature model 510 ($g(X,w_2)$), and the triplet loss function 520 (equation (1)) is illustrated by the following equation (3):

$$g(X_A,w_2)=(1,0),\ g(X_P,w_2)=(0.9,0),\ g(X_N,w_2)=(0.2,0.3),$$
$$L=\max((0.1,0)^2-(0.8,-0.3)^2,0)=\max(-0.7544,0)=0 \quad (3)$$

$g(X_A,w_2)$ represents calculating the eigenvector by putting the weight $w_2$ and the good product sample data into the g function, to obtain the eigenvector (1,0); $g(X_P,w_2)$ represents calculating the eigenvector by putting the weight $w_2$ and the good product data into the g function, to obtain the eigenvector (0.9,0); and $g(X_N,w_2)$ represents calculating the eigenvector by putting the weight $w_2$ and the defective product data into the g function, to obtain the eigenvector (0.2,0.3). A loss value of 0 is obtained by putting the three eigenvectors into the triplet loss function.

By comparing a loss of the weight $w_1$ (L=0.5071) and a loss of the weight $w_2$ (L=0), due to the loss of the weight $w_2$ is less than the loss of the weight $w_1$, in a case in which the weight $w_2$ is used, it is easier to determine the dissimilarity value between the tested object and the selected good product sample data.

The selection of the weight may affect convolutional kernels of the CNN. In this embodiment, training a most suitable convolutional kernel by using the CNN is represented by the following equation:

$w_{ij}^{(k)}$: represents a weight $j$ of a layer $i$ during training $k$.

$$\Delta w_{ij}^{(k)} = \text{learning}_{rate} \times \frac{\partial \text{loss}_k}{\partial h_i} \times \frac{\partial h_i}{\partial w_{ij}} \quad (4)$$

"$\Delta w_{ij}^{(k)}$" represents a variation volume of $w_{ij}$ during each iteration; a "learning rate" is a controllable parameter referred to as a learning rate, which determines a proportion of the weight during each variation;

$$\text{``}\frac{\partial \text{loss}_k}{\partial h_i}\text{''}$$

represents information transmitted to layer i by the loss, and is a nonlinear function that varies with the loss, but is not necessarily in a proportional or inversely proportional relationship; and $$\text{``}\frac{\partial h_i}{\partial w_{ij}}\text{''}$$

represents an amount of relations of the weight in the layer, and the value is associated with a weight value of the entire layer. The foregoing calculating method of the weight w is the calculating method of a backpropagation algorithm and a gradient descent algorithm.

How to calculate the weight is described here by examples. If an initial loss value of the weight $w_0$ is 0.985, given that an initial weight $w_{31}^{(0)}$ is 0.3, an initial weight $w_{32}^{(0)}$ is 0.7, and a learning rate is 0.01, an equation (5) is obtained by using a backpropagation algorithm formula:

$$\frac{\partial \text{loss}_0}{\partial h_3} = -0.00169,\ \frac{\partial h_3}{\partial w_{31}} = 0.1,\ \frac{\partial h_3}{\partial w_{32}} = 0.2 \quad (5)$$

In addition, after iteration is performed on the weight by using the foregoing parameters once, the following result is obtained:

$$w_{31}^{(1)}=w_{31}^{(0)}-\Delta w_{31}^{(0)}=0.3-(0.01\times-0.00169\times0.1)= 0.3000169$$

$$w_{32}^{(1)}=w_{32}^{(0)}-\Delta w_{32}^{(0)}=0.7-(0.01\times-0.00169\times0.2)= 0.7000338$$

In this case, the loss corresponding to the weight changes. Although the foregoing loss may not necessarily decline, $$\text{``}\frac{\partial \text{loss}_k}{\partial h_i}\text{'' and ``}\frac{\partial h_i}{\partial w_{ij}}\text{''}$$

are changing directions that mathematical decline. Therefore, after iteration for a long time, a loss corresponding to a weight usually declines, and a convergent weight is obtained.

The threshold that is set in the dissimilarity model 220 may be determined according to requirements of those who apply this embodiment. The "requirements" refer to, for example, requirements of an application side for accuracy, sensitivity, specificity, or a false positive rate and the like. In another embodiment, it may be determined by using a receiver operating characteristic curve (ROC curve).

Figure 6:
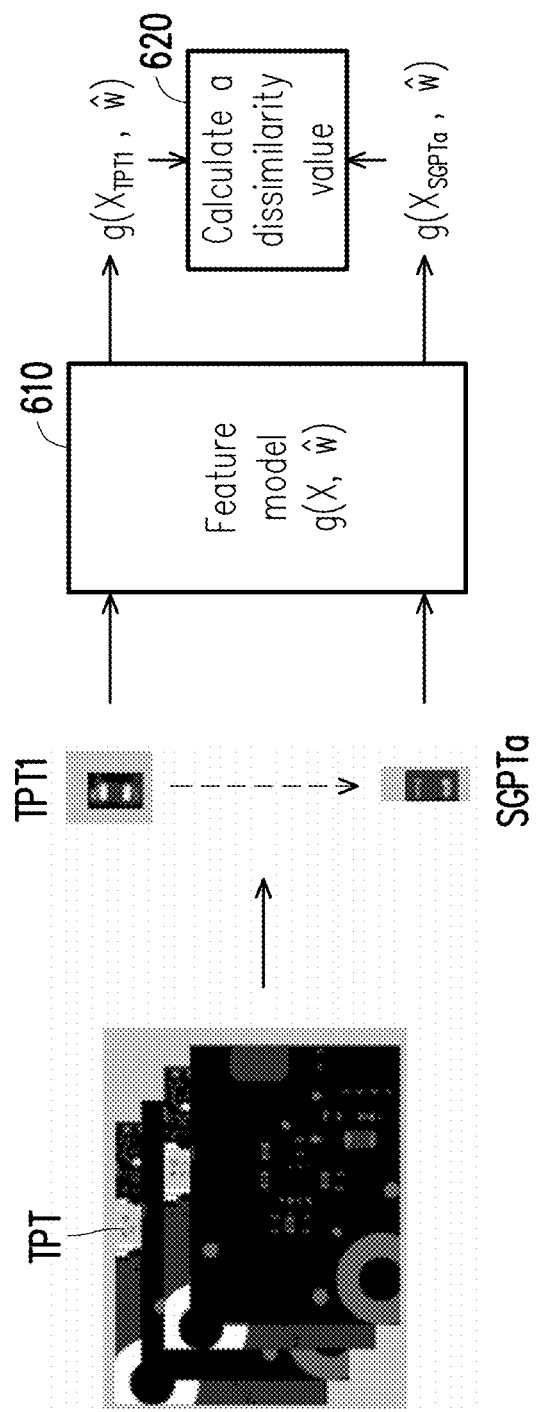
FIG. 6 is a schematic flowchart to illustrate step S350 of FIG. 3 according to an embodiment of the invention.

The "calculating the dissimilarity value of the tested image by using the dissimilarity model" of step S350 in FIG. 3 is illustrated by using FIG. 6 and corresponding descriptions. FIG. 6 is a schematic flowchart to illustrate step S350 of FIG. 3 according to an embodiment of the invention. After the training of the dissimilarity model 220 finishes according to FIG. 5 and corresponding descriptions, in this embodiment in FIG. 6, the foregoing trained weight (the trained weight is represented by "ŵ" herein) is obtained, to construct a second feature model 610 (represented by g(X,ŵ)) based on the trained weight ŵ. The second feature model 610 and the feature model 510 in FIG. 5 are all examples of constructing a feature model calculating structure by using the CNN. However, different from the feature model 510 in FIG. 5, the weight in the second feature model 610 is the foregoing convergent trained weight ŵ, and "X" is image data of an object. On the other hand, tested images TPT and TPT1 of the tested object are obtained in this embodiment. Specifically, after obtaining the tested image TPT, at least one tested object on the tested image TPT, such as TPT1, is captured by using automated optical inspection identification system or other ways of video processing.

Subsequently, selected good product sample data (by an example of an SGPTa herein) corresponding to the tested object is put into the second feature model 610, to obtain a first eigenvector of the selected good product sample data SGPTa. The first eigenvector is represented by $g(X_{SGPTa},\hat{w})$ herein. In addition, a tested image (by using TPT1 as an example herein) of the tested object is put into the second feature model 610, to obtain a second eigenvector of the tested object, and the second eigenvector is represented by $g(X_{TPT1},\hat{w})$ herein. Moreover, a dissimilarity value is calculated according to the first eigenvector $g(X_{SGPTa},\hat{w})$ and the second eigenvector $g(X_{TPT1},\hat{w})$, as indicated by a block 620 in FIG. 6.

The calculation of the dissimilarity value in the block 620 is the first eigenvector $g(X_{SGPTa},\hat{w})$ minus the second eigenvector $g(X_{TPT1},\hat{w})$, taking an absolute value and then squaring, as represented by the following equation (6):

$$DV=\|g(X_{SGPTa},\hat{w})-g(X_{TPT1},\hat{w})\|^2 \quad (6)$$

FIG. 6 is an implementable calculating method of calculating the dissimilarity value. Those who apply this embodiment may adjust the calculation of the dissimilarity value according to requirements thereof, and it is not limited hereto.

Figure 7:
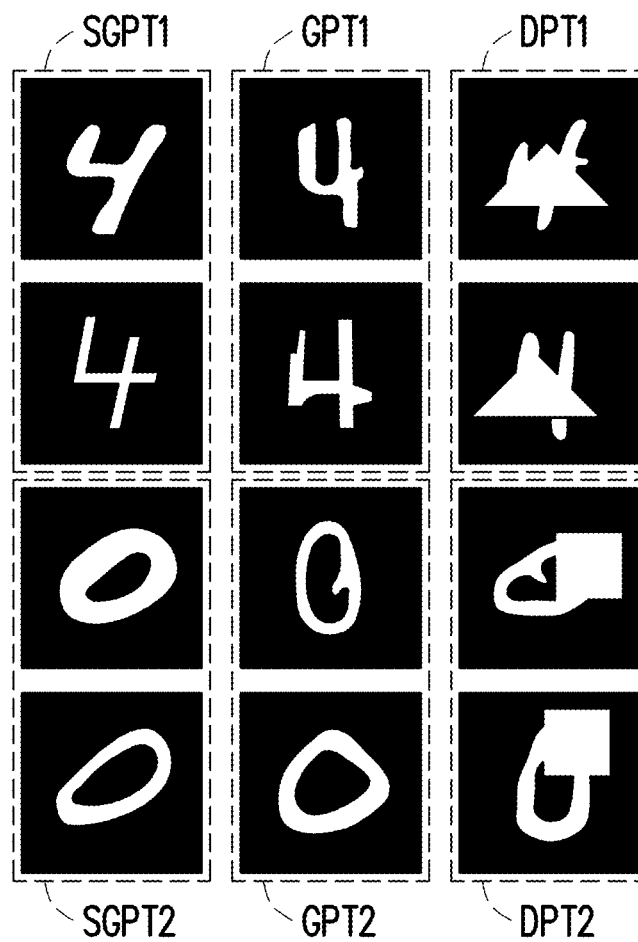
FIG. 7 is a schematic diagram to illustrate defective product data, good product data, and good product sample data of two types of objects according to an embodiment of the invention.

This embodiment of the invention is illustrated herein by using actual images as training data. FIG. 7 is a schematic diagram to illustrate defective product data, good product data, and good product sample data of two types of objects according to an embodiment of the invention. Two objects are used as examples in this embodiment. A first object is an image of number "4", and a second object is an image of number "0". FIG. 7 represents two pieces of good product sample data SGPT1, two pieces of good product data GPT1, and two pieces of defective product data DPT1 of the first object, and two pieces of good product sample data SGPT2, two pieces of good product data GPT2, and two pieces of defective product data DPT2 of the second object. The defective product data DPT1 is an image in which a number "4" is covered by a triangular shade, and is therefore determined to be a defective object. The defective product data DPT2 is an image in which a number "0" is covered by a rectangular shade, and is therefore determined to be a defective object. As shown in FIG. 7, the defective product data DPT2 contains only a second object image covered by a rectangular shade, but not a second object image covered by a triangular shade. Therefore, after the training in this embodiment, one of the testing purposes of this embodiment is to be capable of detecting the second object image covered by a triangular shade to possess a high dissimilarity.

Figure 8:
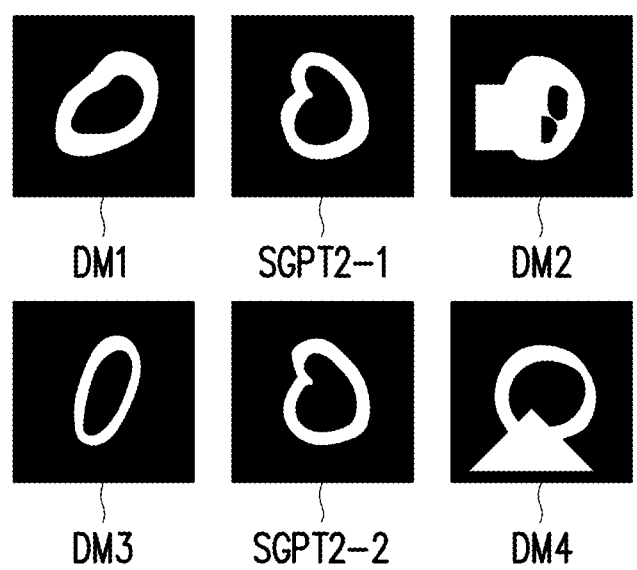
FIG. 8 is a schematic diagram to illustrate selected good product sample data of a second object as a tested object and a tested object image that does not exist in a training dataset according to an embodiment of the invention and FIG. 7.

FIG. 8 is a schematic diagram to illustrate selected good product sample data of a second object as a tested object and a tested object image that does not exist in a training dataset according to an embodiment of the invention and FIG. 7. A first tested object image DM1 of the second object, good product sample data SGPT2-1 of the second object, and a second tested object image DM2 of the second object are shown in a horizontal row on the upper section of FIG. 8. A third tested object image DM3 of the second object, good product sample data SGPT2-2 of the second object, and a fourth tested object image DM4 of the second object are shown in a horizontal row on the lower section of FIG. 8. As can be directly learned from FIG. 8, the first and the third tested object images DM1 and DM3 indicate good products, the second tested object image DM2 indicates a defective product covered by a rectangular shade, and the fourth tested object image DM4 indicates a defective product covered by a triangular shade.

If the dissimilarity value is calculated by using FIG. 7 as the training dataset and using the selected good product sample data SGPT2-1 and the first tested object image DM1 in FIG. 8 and a first dissimilarity value calculated in this embodiment is 0.3237, it indicates that the first dissimilarity value is relatively low, and the first tested object image DM1 is similar to the good product sample data SGPT2-1 and therefore is determined to be a good product. If the dissimilarity value is calculated by using FIG. 7 as the training dataset and using the selected good product sample data SGPT2-1 and the second tested object image DM2 in FIG. 8 and a second dissimilarity value calculated by this embodiment is 1.3341, it indicates that the second dissimilarity value is relatively high, and the second tested object image DM2 is not similar to the good product sample data SGPT2-1 and therefore is determined to be a defective product. Because the second object image covered by a rectangular shade is already shown in the training dataset in FIG. 7, the tested object images DM1, DM2 shown in the horizontal row on the upper section of FIG. 8 are a control group for normal determining.

On the other hand, if the dissimilarity value is calculated by using FIG. 7 as the training dataset and using the selected good product sample data SGPT2-2 and the third tested object image DM3 in FIG. 8 and a third dissimilarity value calculated by this embodiment is 0.2422, it indicates that the third dissimilarity value is relatively low, and the third tested object image DM3 is similar to the good product sample data SGPT2-2, and therefore is determined to be a good product; if the dissimilarity value is calculated by using FIG. 7 as the training dataset and using the selected good product sample data SGPT2-2 and the fourth tested object image DM4 in FIG. 8 and a fourth dissimilarity value calculated by this embodiment is 1.5664, it indicates that the fourth dissimilarity value is relatively high, and the fourth tested object image DM4 is not similar to the good product sample data SGPT2-2 and therefore is determined to be a defective product. It should be appreciated that, the type of the fourth tested object image DM4 does not appear in the training dataset in FIG. 7, that is, the second object image covered by a triangular shade does not appear in FIG. 7. Therefore, this embodiment may determine a defect which previously appears on the first object and now appears on the second object by using the dissimilarity model trained by both the first object and the second object. That is, a training dataset of the second object image covered by a triangle shade does not exist in FIG. 7, but a high dissimilarity may be calculated by using the trained dissimilarity model in this embodiment.

Based on the foregoing, in this embodiment of the invention, a sharable machine learning algorithm model is built by using different types of objects/parts to automatically determine whether the object includes a defect and meanwhile is able to be applied to multiple objects, circuit components or parts, and an error rate of defect determining is further reduced based on the original automated optical inspection technology. Therefore, in this embodiment of the invention, different machine learning algorithm models for different objects/parts do not need to be built, so that a research and development time of a defect classification model for new objects/parts is reduced when a new production line is built, and a relatively effective machine learning algorithm model can still be built even in lack of adequate amount of good product data and defective product data of the new objects/parts. Moreover, by performing a second test when automated optical inspection identification technology has been performed, "overkill" events can be reduced.

What is claimed is:

1. A method for determining whether an object comprises a defect, comprising:
    obtaining multiple training datasets corresponding to different types of multiple objects, wherein one of the multiple training datasets is corresponding to one of the multiple objects, wherein each of the multiple training datasets comprising at least one piece of defective product data of each object, at least one piece of good product data of the each object and at least one piece of good product sample data of the each object;
    training a dissimilarity model based on the defective product data, the good product data and the good product sample data in the multiple training datasets, wherein the dissimilarity model is trained by a triplet loss supervised learning algorithm;
    capturing an image of the object under test to obtain the tested image of a tested object;
    obtaining selected good product sample data corresponding to the tested object; and
    calculating a dissimilarity value between the tested image and the selected good product sample data by using a dissimilarity model, and determining whether the tested object is a good product or a defective product according to the dissimilarity value.

2. The method for determining whether the object comprises a defect according to claim 1, wherein the training the dissimilarity model comprises:
    putting the training dataset corresponding to the object and a weight into a first feature model to obtain an eigenvector;
    calculating a triplet loss value of the object by using a triplet loss function and the eigenvector;
    summing up one or more of the triplet loss values corresponding to each of the objects to obtain a total triplet loss value of the training dataset;
    calculating a gradient of the weight and the triplet loss value by using a backpropagation algorithm and performing iteration on the weight by using a gradient descent algorithm and the gradient, to further obtain an iterated weight; and
    training the dissimilarity model again by using the iterated weight,
    wherein the iterated weight possesses a less total triplet loss value compared with the total triplet loss value corresponding to the weight, and in response to the total triplet loss value approaching a constant after multiple times of training, the training of the dissimilarity model is finished and the iterated weight is regarded as a trained weight, and the dissimilarity model calculates the dissimilarity value between the tested image and the selected good product sample data by using the trained weight.

3. The method for determining whether the object comprises a defect according to claim 2, wherein the weight comprises multiple weights of a convolutional kernel of a first layer convolutional neural network, a convolutional kernel of a second layer convolutional neural network, and a fully connected layer in a third layer convolutional neural network.

4. The method for determining whether the object comprises a defect according to claim 2, wherein the calculating the dissimilarity value between the tested image and the selected good product sample data by using the dissimilarity model comprises:
    obtaining the trained weight, and constructing a second feature model according to the trained weight;
    putting the selected good product sample data into the second feature model to obtain a first eigenvector of the selected good product sample data;
    putting the tested image of the tested object into the second feature model to obtain a second eigenvector of the tested object; and
    calculating the dissimilarity value according to the first eigenvector and the second eigenvector,
    wherein the dissimilarity value is a squared value of an absolute of a difference between the first eigenvector and the second eigenvector.

5. The method for determining whether the object comprises a defect according to claim 1, wherein the determining whether the tested object is a good product or a defective product according to the dissimilarity value comprises:
    in response to the dissimilarity value being greater than a threshold, determining that the tested object is a defective product; and
    in response to the dissimilarity value being less than the threshold, determining that the tested object is a good product.

6. The method for determining whether the object comprises a defect according to claim 1, wherein the dissimilarity model makes a dissimilarity between a cluster of the defective product data and the good product sample data greater than a dissimilarity between a cluster of the good product data and the good product sample data.

7. The method for determining whether the object comprises a defect according to claim 1, wherein the at least one piece of defective product data, the at least one piece of good product data and the good product sample data are all image data.

8. The method for determining whether the object comprises a defect according to claim 1, wherein the object is a circuit component used on a circuit board.

9. A device for determining whether an object comprises a defect, comprising:
    an object database, possessing multiple training datasets corresponding to different types of multiple objects, wherein one of the multiple training datasets is corresponding to one of the multiple objects, wherein each of the multiple training datasets comprises at least one piece of defective product data of each object, at least one piece of good product data of the each object and at least one piece of good product sample data of the each object;
    an image source device, configured to capture an image of the object under test to obtain a tested image of a tested object; and a processor, coupled to the object database and the image source device, wherein the processor obtains the tested image of the tested object by using the image source device, and obtains selected good product sample data corresponding to the tested object by using the object database, and the processor calculates a dissimilarity value between the tested image and the selected good product sample data by using a dissimilarity model, and determines whether the tested object is a good product or a defective product according to the dissimilarity value;

wherein the dissimilarity model is trained based on the defective product data, the good product data and the good product sample data in the multiple training datasets, wherein the dissimilarity model is trained by a triplet loss supervised learning algorithm.

10. The device for determining whether the object comprises a defect according to claim 9, wherein the dissimilarity model is trained comprises:

putting the training dataset corresponding to the object and a weight into a first feature model to obtain an eigenvector;

calculating a triplet loss value of the object by using a triplet loss function and the eigenvector;

summing up one or more of the triplet loss values corresponding to each of the objects to obtain a total triplet loss value of the training dataset;

calculating a gradient of the weight and the triplet loss value by using a backpropagation algorithm and performing iteration on the weight by using a gradient descent algorithm and the gradient, to further obtain an iterated weight; and training the dissimilarity model again by using the iterated weight, wherein the iterated weight possesses a less total triplet loss value compared with the total triplet loss value corresponding to the weight, and in response to the total triplet loss value approaching a constant after multiple times of training, the training of the dissimilarity model is finished and the iterated weight is regarded as a trained weight, and the dissimilarity model calculates the dissimilarity value between the tested image and the selected good product sample data by using the trained weight.

11. The device for determining whether the object comprises a defect according to claim 10, wherein the weight comprises multiple weights of a convolutional kernel of a first layer convolutional neural network, a convolutional kernel of a second layer convolutional neural network, and a fully connected layer in a third layer convolutional neural network.

12. The device for determining whether the object comprises a defect according to claim 10, wherein the processor obtains the trained weight, constructs a second feature model according to the trained weight, puts the selected good product sample data into the second feature model to obtain a first eigenvector of the selected good product sample data, and puts the tested image of the tested object into the second feature model to obtain a second eigenvector of the tested object, and the processor calculates the dissimilarity value according to the first eigenvector and the second eigenvector, wherein the dissimilarity value is a squared value of an absolute of a difference between the first eigenvector and the second eigenvector.

13. The device for determining whether the object comprises a defect according to claim 9, wherein in response to the dissimilarity value being greater than a threshold, the processor determines that the tested object is a defective product; and in response to the dissimilarity value being less than the threshold, the processor determines that the tested object is a good product.

14. The device for determining whether the object comprises a defect according to claim 9, wherein the dissimilarity model makes a dissimilarity between a cluster of the defective product data and the good product sample data greater than a dissimilarity between a cluster of the good product data and the good product sample data.

15. The device for determining whether the object comprises a defect according to claim 9, wherein the image source device is an image capture device or an automated optical inspection identification system.

16. The device for determining whether the object comprises a defect according to claim 9, wherein the at least one piece of defective product data, the at least one piece of good product data and the good product sample data are all image data.

17. The device for determining whether the object comprises a defect according to claim 9, wherein the object is a circuit component used on a circuit board.

* * * * *